United States Patent
Porter et al.

(10) Patent No.: US 10,279,915 B2
(45) Date of Patent: May 7, 2019

(54) LOW-PROFILE LATCH INTERFACE FOR HEADREST STORAGE COMPARTMENT

(71) Applicant: AMI Industries, Inc., Colorado Springs, CO (US)

(72) Inventors: Ryan Porter, Monument, CO (US); Kyler Marutzky, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 15/586,533

(22) Filed: May 4, 2017

(65) Prior Publication Data

US 2018/0319504 A1    Nov. 8, 2018

(51) Int. Cl.
| | |
|---|---|
| *B64D 11/06* | (2006.01) |
| *B64D 11/00* | (2006.01) |
| *E05B 83/28* | (2014.01) |
| *E05C 19/12* | (2006.01) |
| *B60N 2/90* | (2018.01) |
| *B60N 2/879* | (2018.01) |
| *B60R 7/04* | (2006.01) |

(52) U.S. Cl.
CPC .......... *B64D 11/0636* (2014.12); *B60N 2/879* (2018.02); *B60N 2/933* (2018.02); *B60R 7/043* (2013.01); *B64D 11/00155* (2014.12); *B64D 11/0632* (2014.12); *B64D 11/0638* (2014.12); *B64D 11/0646* (2014.12); *B64D 11/0691* (2014.12); *E05B 83/28* (2013.01); *E05C 19/12* (2013.01)

(58) Field of Classification Search
CPC ............ B64D 11/0636; B64D 11/0632; B64D 11/0638; B64D 11/00155; B64D 11/0646; B64D 11/0691; E05B 83/28; E05B 15/0086; E05B 57/00; E05B 59/00; E05B 79/08; E05B 79/16; E05B 83/30; E05B 85/04; E05C 19/12; E05C 1/08; E05C 3/12; E05C 3/124; E05C 3/30; E05C 3/34; E05C 3/38; E05C 9/002; E05C 19/024; B60N 2/933; B60N 2/879; B60R 7/043; B60R 2011/0017
See application file for complete search history.

(56) References Cited

U.S. PATENT DOCUMENTS

| | | | |
|---|---|---|---|
| 2,454,926 A | 11/1948 | Jacobi | |
| 2,720,773 A | 10/1955 | Gehrie | |
| 5,042,853 A | 8/1991 | Gleason et al. | |

(Continued)

FOREIGN PATENT DOCUMENTS

| | | |
|---|---|---|
| FR | 2799350 | 4/2001 |
| FR | 2921960 | 4/2009 |

OTHER PUBLICATIONS

European Patent Office, European Search Report dated Oct. 24, 2018 in Application No. 18169092.6-1010.

*Primary Examiner* — Theodore V Adamos
(74) *Attorney, Agent, or Firm* — Snell & Wilmer, L.L.P.

(57) ABSTRACT

A securement mechanism for a storage compartment in a seat headrest may comprise a housing tray and a first latch disposed in the housing tray. A release button may be disposed in the housing tray and may contact the first latch. The release button may be configured to be substantially coplanar with the housing tray when the securement mechanism is in a secured position.

20 Claims, 10 Drawing Sheets

(56) References Cited

U.S. PATENT DOCUMENTS

| | | | |
|---|---|---|---|
| 5,154,374 A | 10/1992 | Beroth | |
| 6,048,001 A | 4/2000 | Miller | |
| 7,188,896 B2* | 3/2007 | Embach | B60R 7/043 |
| | | | 297/217.4 |
| 8,672,368 B2* | 3/2014 | Grosdemouge | E05B 81/14 |
| | | | 292/201 |
| 2005/0156433 A1* | 7/2005 | Nemoto | E05B 83/30 |
| | | | 292/163 |
| 2006/0001307 A1 | 1/2006 | Embach | |
| 2008/0148752 A1* | 6/2008 | Marginean | B60H 1/00271 |
| | | | 62/244 |
| 2015/0115668 A1* | 4/2015 | Martinak | B60N 3/004 |
| | | | 297/163 |
| 2015/0123408 A1* | 5/2015 | Longo | E05B 83/30 |
| | | | 292/137 |
| 2015/0240539 A1 | 8/2015 | Abe | |
| 2016/0145917 A1* | 5/2016 | Kim | E05B 65/0042 |
| | | | 312/405 |
| 2016/0194907 A1* | 7/2016 | Kikuchi | B60R 7/06 |
| | | | 292/242 |

\* cited by examiner

LOW-PROFILE LATCH INTERFACE FOR HEADREST STORAGE COMPARTMENT

FIELD OF INVENTION

The present disclosure relates to aircraft seats and, more specifically, to a securement mechanism for a storage compartment in a seat headrest.

BACKGROUND

Aircraft cabin attendant seats are used for flight attendant safety and comfort during taxi, takeoff, landing, and inflight rest periods. Useable storage space in an aircraft cabin may be limited, and areas within the flight attendant seats may be used for storage. For example, a personal breathing apparatus ("PBE") may be housed within a compartment behind the headrest of the flight attendant seat. Using a compartment behind the headrest for storage may involve installation of a securement mechanism to ensure the headrest does not open unintentionally during flight. The securement mechanism may allow quick and easy access to the equipment stored within the headrest. Space above the seat, from which the securement mechanism can be released, may be limited due to an attendant module or other aircraft equipment that might exist on the wall over the seat.

SUMMARY

A securement mechanism for a storage compartment in a seat headrest is disclosed, according to various embodiments. A securement mechanism for a storage compartment in a seat headrest may comprise a housing tray, a first latch disposed in the housing tray, and a release button disposed in the housing tray and contacting the first latch. The release button may be configured to be substantially coplanar with the housing tray when the securement mechanism is in a secured position.

In various embodiments, a second latch may be disposed in the housing tray. A first biasing member may be in operable communication with the first latch and may bias the first latch toward a first latch position that secures the securement mechanism. A second biasing member may be in operable communication with the second latch and may bias the second latch toward a second latch position that secures the securement mechanism. A pivot shaft may be disposed in the housing tray. The first latch and the second latch may be mounted to the pivot shaft. The first biasing member may be configured to apply a first torque to the first latch and may cause the first latch to rotate about the pivot shaft in a first circumferential direction. The second biasing member may be configured to apply a second torque to the second latch and may cause the second latch to rotate about the pivot shaft in the first circumferential direction.

In various embodiments, the housing tray may comprise a guidepost. The guidepost of the housing tray may be disposed through an opening in the release button. In various embodiments, a pivot shaft may be disposed in the housing tray. The first latch and the second latch may be rotational about an axis of the pivot shaft. A first pivot shaft retainer may be configured to retain the pivot shaft relative to the housing tray. A second pivot shaft retainer may be configured to retain the pivot shaft relative to the housing tray. At least one of the first pivot shaft retainer and the second pivot shaft retainer may be configured to provide a contact surface for the release button. In various embodiments, the first latch and the second latch may be disposed between the first pivot shaft retainer and the second pivot shaft retainer. In various embodiments, at least one of the first pivot shaft retainer and the second pivot shaft retainer may be disposed between the first latch and the second latch.

A seat may comprise a housing and a headrest door rotationally coupled to the housing. A striker may be coupled to the headrest door and a housing tray may be coupled to the housing. A securement mechanism may be disposed in the housing tray. The securement mechanism may comprise a first latch configured to extend into an opening in the striker, and a release button contacting the first latch. The release button may be configured to be substantially coplanar with the housing tray when the securement mechanism is in a secured position.

In various embodiments, a second latch may be configured to extend into the opening in the striker. In various embodiments, the securement mechanism may further comprise a pivot shaft, a pivot shaft retainer disposed over the pivot shaft and coupled to the housing tray, and a biasing member in operable communication with the first latch. The first latch may be mounted to the pivot shaft. In various embodiments, the biasing member may be configured to apply a first torque to the first latch and may cause the first latch to rotate about the pivot shaft in a first circumferential direction. The release button may be configured to apply a second torque to first latch and may cause the first latch to rotate about the pivot shaft in a second circumferential direction opposite the first circumferential direction when the second torque is greater than the first torque. The pivot shaft retainer may be configured to provide a contact surface for the release button. In various embodiments, a collapsible bulb seal may be disposed between the headrest door and the housing tray.

A method of securing a storage compartment in a seat may comprise coupling a striker to a headrest door, coupling a housing tray to a housing of the seat, and disposing a securement mechanism in the housing tray, the securement mechanism may comprise a first latch configured to extend into an opening in the striker, and a release button contacting the first latch. The release button may be configured to be substantially coplanar with the housing tray when the securement mechanism is in a secured position.

In various embodiments, the method may further comprise disposing a collapsible bulb seal between the housing tray and the headrest door. The method may further comprise disposing a pivot shaft in the housing tray, mounting the first latch to the pivot shaft, disposing a biasing member in the housing tray, and disposing a pivot shaft retainer over the pivot shaft. In various embodiments, the biasing member may contact the first latch. In various embodiments, the securement mechanism may further comprise a second latch configured to operate independently of the first latch.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact. Surface shading lines may be used throughout the figures to denote different parts but not necessarily to denote the same or different materials.

Figure 1A:
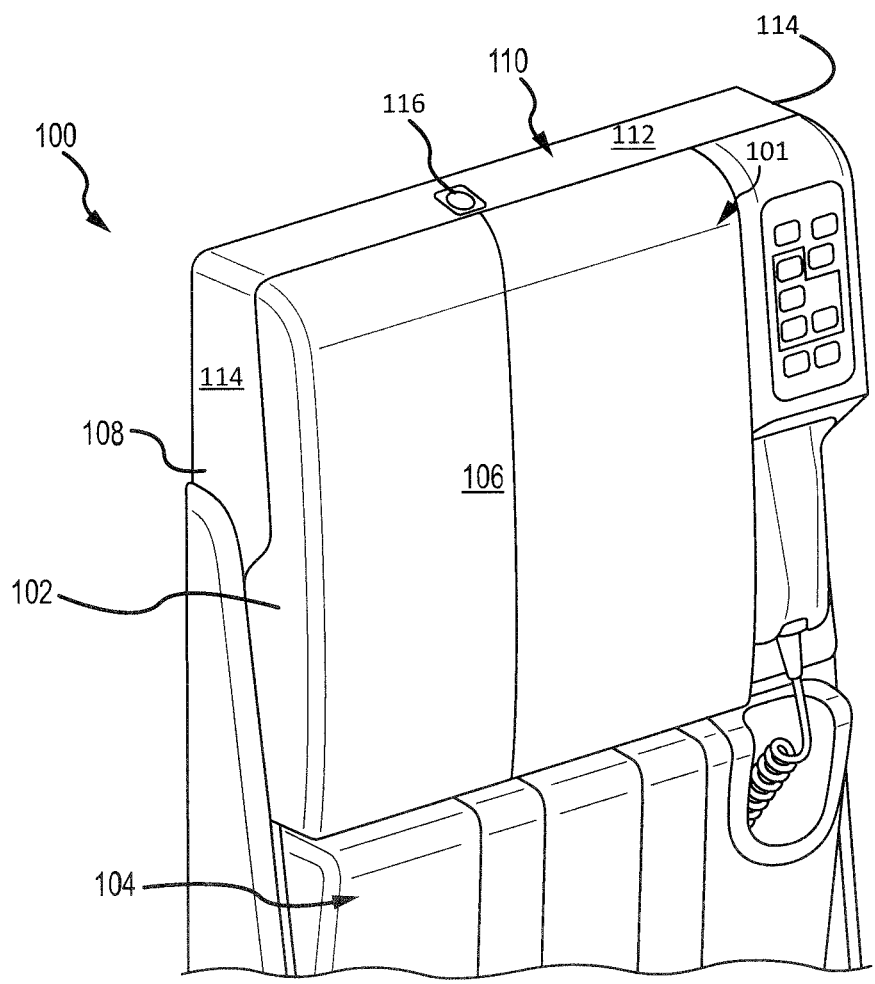
- FIGS. 1A and 1B illustrate a storage compartment of a seat headrest, in a secured position and an unsecured position, respectively, in accordance with various embodiments.

With reference to FIG. 1A, a seat 100 with a headrest storage compartment 101 in a secured position is illustrated, in accordance with various embodiments. A headrest door 102 (also referred to as door) and seatback 104 may be partially stored within a housing 108 of seat 100. Housing 108 provides structural support for door 102 and seatback 104. Door 102 may include a cushion 106. Housing 108 may include a housing tray 110. Door 102 may be secured to housing tray 110. A surface 112 of housing tray 110 may form an upper surface of housing 108. Housing tray 110 may be coupled to sidewalls 114 of housing 108, via a bolt, an adhesive, a clasp, or other suitable attachment mechanism. A release button 116 may be disposed in housing tray 110. Release button 116 may release a securement mechanism (discussed in further detail below) within housing tray 110 to unsecure, or release, door 102 from housing tray 110.

Figure 1B:
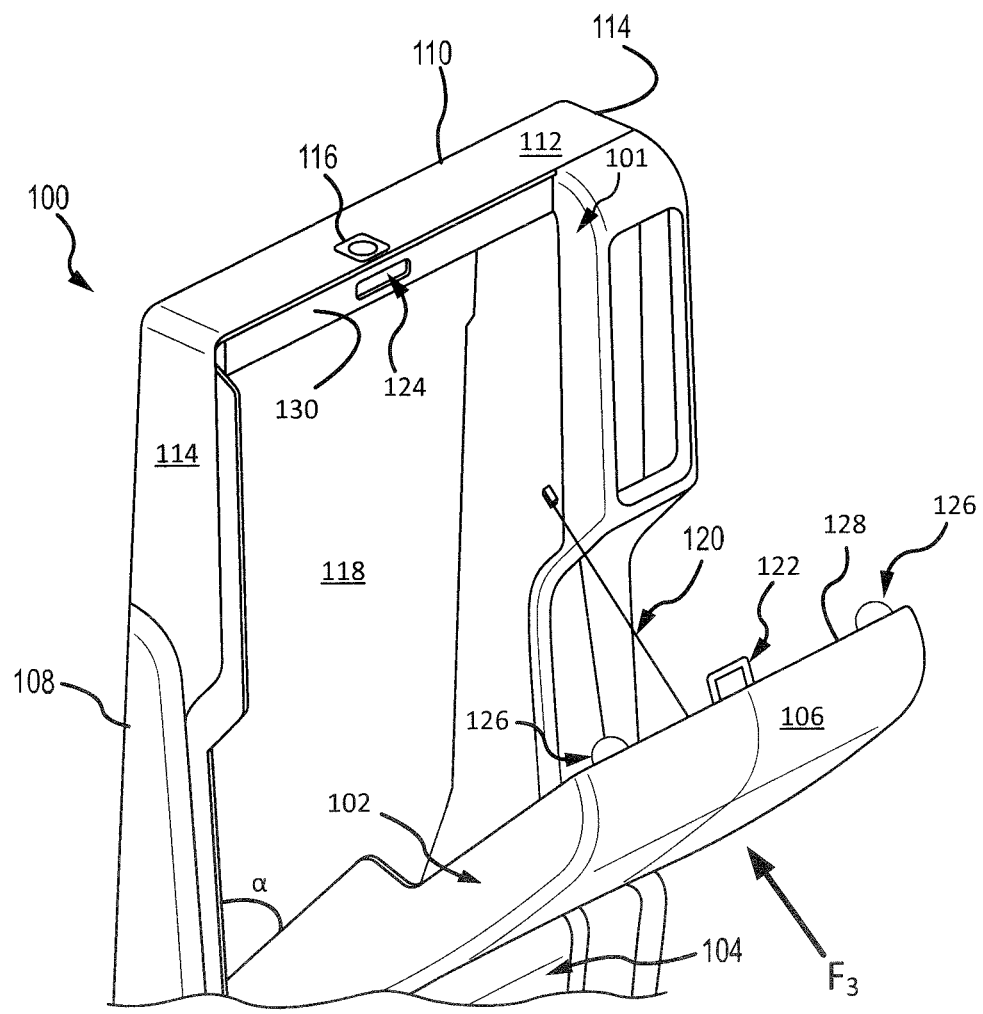

FIG. 1B illustrates door 102 in a released, or unsecured, position, in accordance with various embodiments. Releasing door 102 may expose a volume 118 within housing 108. Door 102 may be pivotably coupled to housing 108 via a hinge or other suitable attachment mechanism. Door 102 may pivot away from housing 108, upon a pressing of release button 116. A retaining line 120 may be coupled to housing 108 and to door 102. Retaining line 120 may be configured to limit the rotation (i.e., angle α) of door 102 away from housing 108.

Door 102 may include a striker 122. Striker 122 may be configured to align with an opening 124 in housing tray 110. When door 102 is in a secured position (FIG. 1A), striker 122 may be located through opening 124 and engaged by the securement mechanism within housing tray 110. Striker 122 may comprise a metal or metal alloy. For example, in various embodiments, striker 122 may comprise a metal such as steel or aluminum. Striker 122 may be formed by stamping, machining, or other suitable metal working process. Striker 122 may be coupled to door 102 via an attachment mechanism, for example, via a bolt, clasp, adhesive, or other suitable attachment mechanism. In various embodiments, striker 122 may be coupled to door 102 by molding door 102 around striker 122. Stated another way, striker 122 may be disposed in the mold during an injection molding of door 102. In various embodiments, striker 122 may comprise a plastic material and may be integrally formed with door 102.

In various embodiments, a plurality of collapsible bulb seals 126 may be attached to an internal surface 128 of door 102, opposite cushion 106. Collapsible bulb seals 126 comprise a compressible material. For example, collapsible bulb seals 126 may comprise rubber, elastomer, or other elastic material. When door 102 is in a secured position (FIG. 1A), collapsible bulb seals 126 may compress between surface 130 of housing tray 110 and internal surface 128 of door 102. When door 102 is in the secured position, the decompressive force of compressed collapsible bulb seals 126 acts against surface of 130 of housing tray 110 and internal surface 128 of door 102 to push door 102 away from housing tray 110 and tend to prevent door 102 from rattling against housing tray 110. Collapsible bulb seals 126 may be attached to door 102 via an adhesive. Collapsible bulb seals 126 are illustrated as a plurality of semi-spherical bulbs for purposes of illustration. Collapsible bulb seals 126 may be cylindrical, conical, trapezoidal, or any other geometric shape. In various embodiments, collapsible bulb seals 126 may be formed as a strip of compressible material attached to internal surface 128 of door 102. In various embodiments, collapsible bulb seals 126 may be attached to surface 130 of housing tray 110.

Figure 2A:
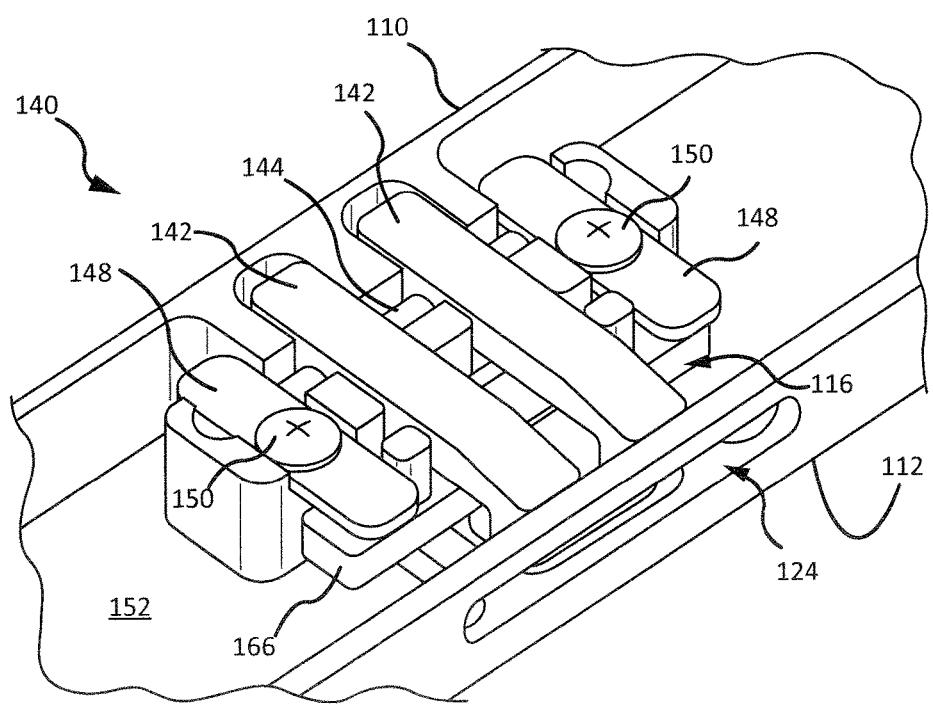
FIGS. 2A, 2B, and 2C illustrate a securement mechanism for a storage compartment in a seat headrest, in accordance with various embodiments.
Figure 2B:
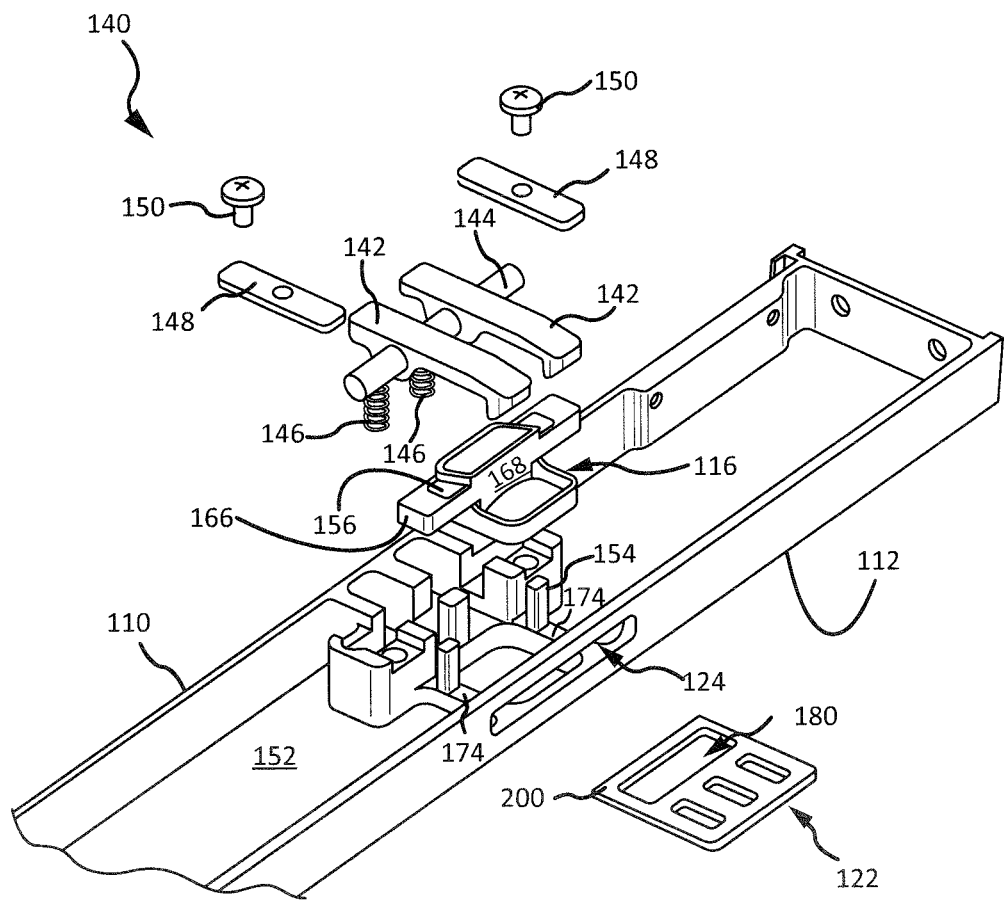

With reference to FIG. 2A and FIG. 2B, a securement mechanism 140 disposed within housing tray 110 is illustrated, with housing tray rotated 180° relative to FIG. 1A and FIG. 1B, in accordance with various embodiments. In various embodiments, securement mechanism 140 may include two latches 142. Latches 142 may comprise a thermoplastic. For example, in various embodiments, latches 142 may comprise polyoxymethylene. In various embodiments, latches 142 may comprise a metal. Latches 142 may be mounted to a pivot shaft 144, and may be rotational about an axis of pivot shaft 144. Pivot shaft 144 may comprise a metal or metal alloy. For example, in various embodiments, pivot shaft 144 may comprise a metal such as steel or aluminum. A set of two biasing members 146 may be disposed between housing tray 110 and latches 142. In various embodiments, biasing members 146 may comprise compressive springs.

Biasing members 146 may be in operable communication with latches 142. A set of pivot shaft retainers 148 may be disposed over pivot shaft 144. Pivot shaft retainers 148 may be configured to retain pivot shaft 144 relative to housing tray 110. Pivot shaft retainers 148 may comprise a metal such as steel or aluminum. Retainer screws 150 may secure pivot shaft retainers 148 to housing tray 110. Retainer screws 150, pivot shaft retainers 148, and/or housing tray 110 may be configured to prevent vertical movement of pivot shaft 144 (i.e., prevent pivot shaft 144 from moving along a plane that is generally perpendicular to internal surface 152 of housing tray 110).

Figure 2C:
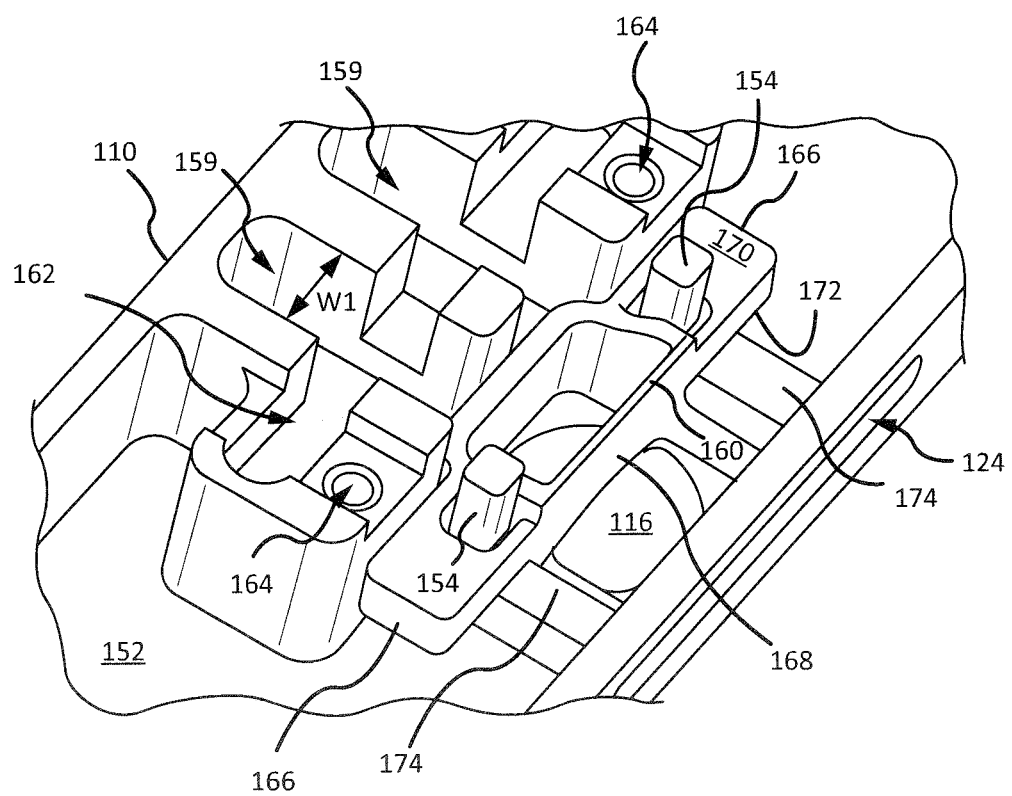

With reference to FIG. 2B and FIG. 2C, housing tray 110 includes an internal surface 152 opposite surface 112. In various embodiments, housing tray 110 may include guideposts 154, which may extend from internal surface 152. Guideposts 154 may be configured to slidably engage openings 156 in release button 116. Guideposts 154 may prevent release button 116 from tilting. In other words, with reference to FIG. 3A, guideposts 154 may keep surface 158 of release button 116 horizontal and/or parallel with surface 112 of housing tray 110. Preventing release button 116 from tilting may help to ensure that, when release button 116 is pressed, an equal amount of force is applied to each latch 142. A depression 117 may be formed in surface 158 of release button 116. Depression 117 may help guide the finger of a person seeking to open securement mechanism 140 (i.e., release door 102) to the center of release button 116.

Returning to FIGS. 2B and 2C, housing tray 110 may include latch channels 159. Latch channels 159 may be configured to house biasing members 146 and latches 142. A width W1 of latch channels 159 may be selected to prevent latches 142 from shifting horizontally (i.e., from shifting along a plane that is generally parallel with respect to internal surface 152 of housing tray 110). Width W1 may be selected to keep latches 142 aligned with a latch striking surface 160 of release button 116. Housing tray 110 may include a pivot shaft channel 162. Pivot shaft channel 162 may be configured to house pivot shaft 144. Housing tray 110 may include openings 164. Openings 164 may be configured to receive retainer screws 150. Housing tray 110 may be formed by machining, injection molding, stamping, casting, additive manufacturing, or any other suitable manufacturing process. In various embodiments, housing tray 110 may comprise a plastic, for example, polypropylene, polyvinyl chloride, polycarbonate, polyetheretherketone, etc. In various embodiments, housing tray 110 may comprise a metal, metal alloy, wood, or ceramic.

Release button 116 may include two horizontal protrusions 166, which extend along a plane generally parallel to internal surface 152 of housing tray 110, and a vertical protrusion 168, which extends along a plane generally perpendicular to internal surface 152 of housing tray 110. Vertical protrusion 168 may include latch striking surface 160. Horizontal protrusions 166 may include openings 156, which allow release button 116 to slide vertically along guideposts 154 of housing tray 110. Horizontal protrusions 166 include opposing surfaces 170 and 172. Surface 170 of horizontal protrusions 166 may be oriented toward pivot shaft retainers 148. Surface 170 of horizontal protrusions 166 may provide a "bottom out" surface (also referred to herein as a contact surface) for release button 116. For example, with momentary reference to FIG. 3B, when release button 116 is pressed (i.e., when pressure is applied to the surface 158 of release button 116), release button 116 will travel downward (i.e., in a negative y-direction on the xyz axes provided for reference) into housing tray 110, until surface 170 of horizontal protrusions 166 contacts pivot shaft retainers 148. In other words, horizontal protrusions 166 may cause release button 116 to contact or "bottom out" against pivot shaft retainers 148.

Returning to FIG. 2C, surface 172 of horizontal protrusions 166 may contact and may rest against raised surfaces 174 of housing tray 110. In various embodiments, surfaces 174 of housing tray 110 may be raised with respect to internal surface 152 of housing tray 110. In other words, with reference to FIG. 2B, a first dimension, or first thickness, of housing tray 110 that extends from surface 112 to internal surface 152 is less than a second dimension, or second thickness, of housing tray 110 that extends from surface 112 to surfaces 174. The thickness of housing tray 110 at surfaces 174 may be selected such that when door 102 is in a secured position (FIG. 1A), latches 142 extend into an opening 180 in striker 122.

Figure 3A:
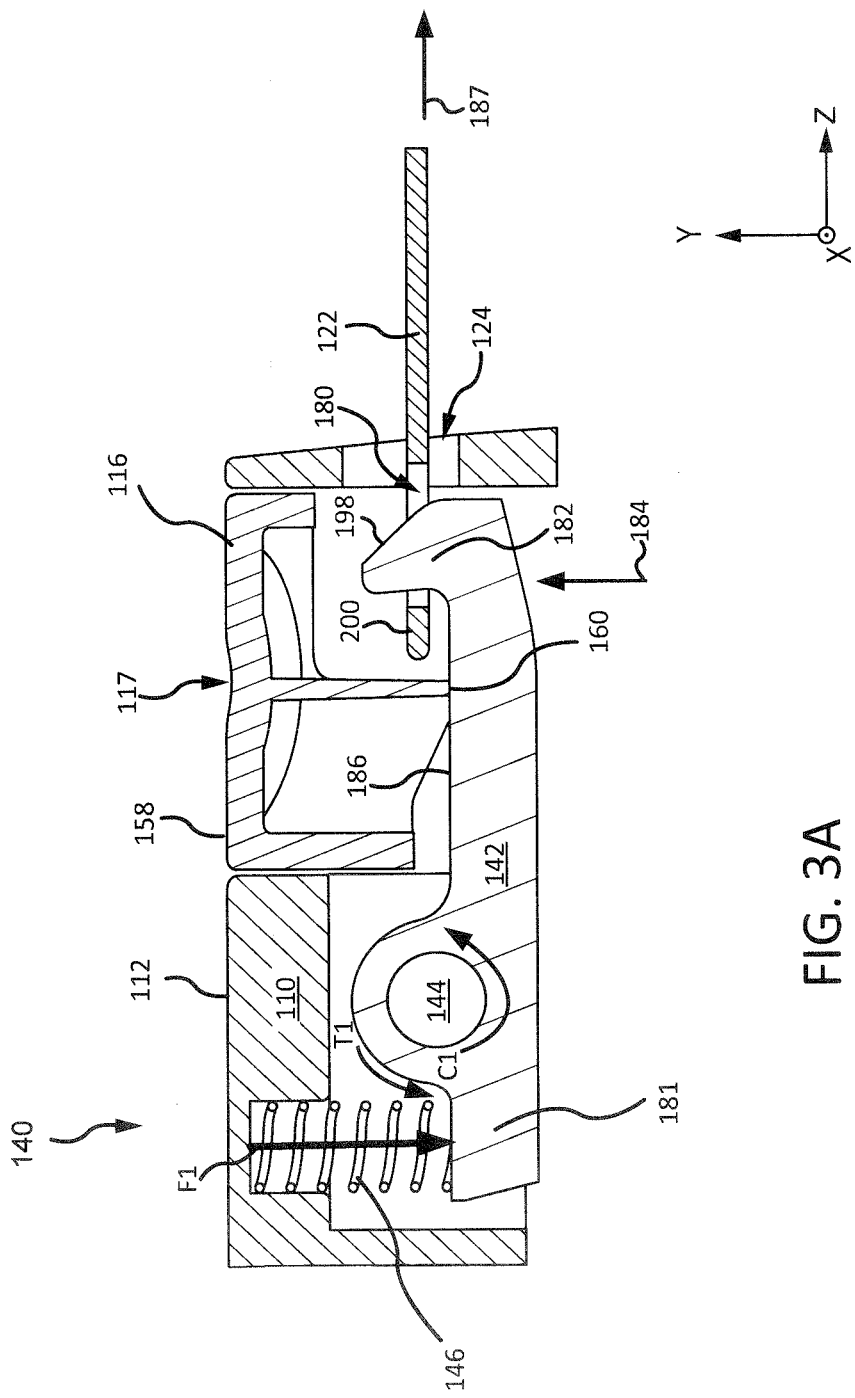
FIGS. 3A and 3B illustrate a securement mechanism for a storage compartment of a seat headrest in a secured position and an unsecured position, respectively, in accordance with various embodiments.
Figure 3B:
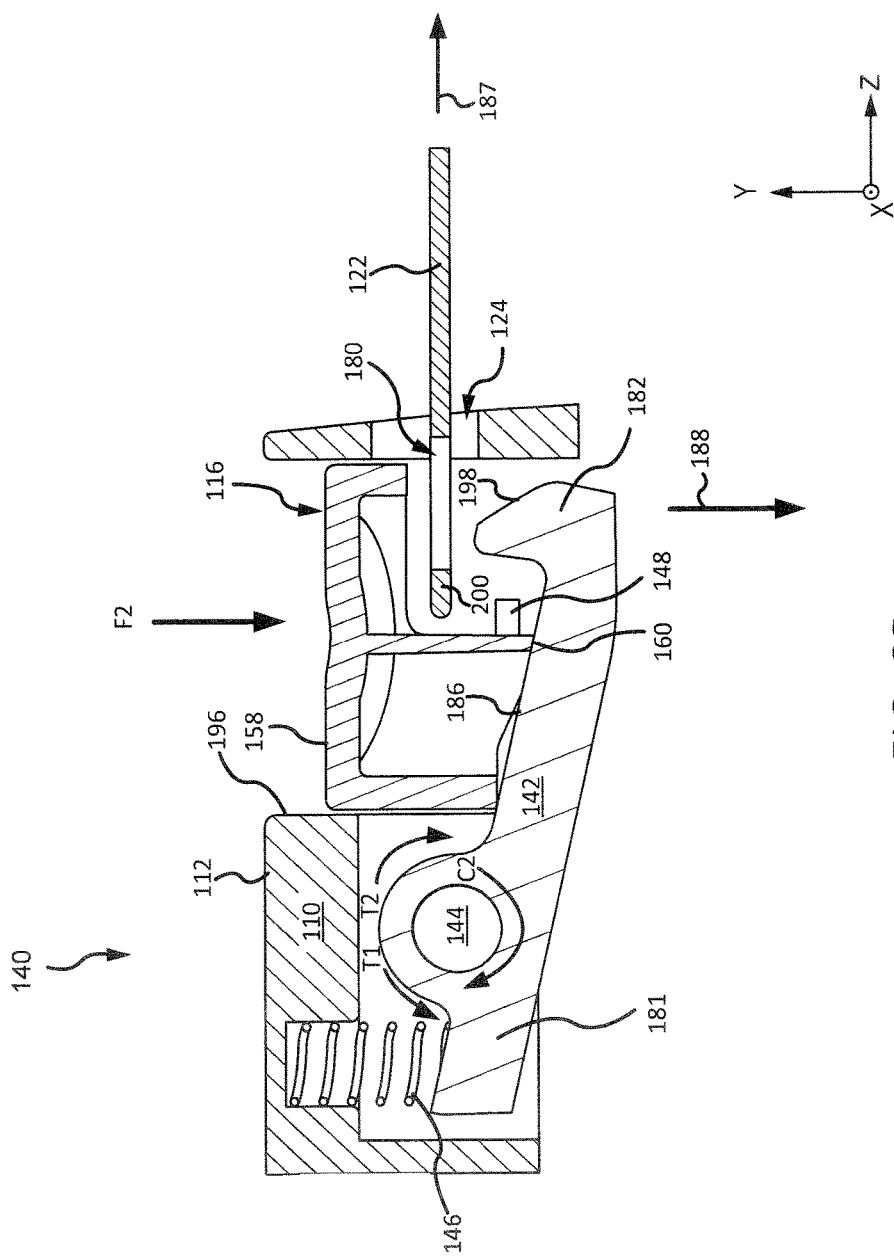

FIGS. 3A and 3B illustrate a cross-sectional view of securement mechanism 140, with securement mechanism rotated 180° relative to FIG. 2A and FIG. 2B, in accordance with various embodiments. While the cross-sectional view shown in FIGS. 3A and 3B illustrates a single latch 142 and a single biasing member 146, it should be understood that the second latch 142 and the second biasing member 146 may be configured to operate in a similar manner. With reference to FIG. 3A, securement mechanism 140 is shown in a secured position, in accordance with various embodiments. Biasing member 146 may contact a spring end 181 of latch 142. Biasing member 146 may apply a force F1 to a spring end 181 of latch 142, which may generate a first torque T1 and may cause latch 142 to rotate about pivot shaft 144 in a first circumferential direction C1. Torque T1 may cause a hook end 182 of latch 142, opposite spring end 181, to travel upward in the direction of arrow 184. Torque T1 may cause hook end 182 to travel into opening 180 of striker 122. Locating hook end 182 in opening 180 may secure striker 122 within opening 124 of housing tray 110 and may prevent striker 122 from traveling in the direction of arrow 187. Stated another way, biasing member 146 may bias latch 142 toward a latch position that secures securement mechanism 140.

With reference to FIG. 2C and FIG. 3A, torque T1 may cause a surface 186 of latch 142 to contact latch striking surface 160 of release button 116. Torque T1 may cause release button 116 and hook end 182 of latch 142 to travel upward until horizontal protrusions 166 of release button 116 contact surfaces 174 of housing tray 110. In other words, hook end 182 of latch 142 and release button 116 may travel upwards in the direction of arrow 184 (i.e., in the positive y-direction), until horizontal protrusions 166 cause release button 116 to contact (i.e., "top out" against) surfaces 174 of housing tray 110. In various embodiments, the thickness of housing tray 110 at surfaces 174 and/or a thickness of horizontal protrusions 166 may be selected to ensure that, when release button 116 tops out against surfaces 174, surface 158 of release button 116 is substantially coplanar with surface 112 of housing tray 110. As used herein, the phrase "substantially coplanar" means +/−2 millimeters (mm) as measured along the y-axis. Thus, when securement mechanism 140 is in a secured position, surface 158 of release button 116 may be substantially coplanar with surface 112 of housing tray 110. Surface 158 of release button 116 being substantially coplanar with surface 112 of housing tray 110 may reduce a vertical profile of securement mechanism 140 and may allow securement mechanism 140 to be employed when an amount of space above the seat compartment is limited. For example, release button 116 and securement mechanism 140 may be accessible when a space above the seat compartment is less than 1 inch (2.54 cm). In various embodiments, release button 116 and securement mechanism 140 may be accessible when a space above the seat compartment is 0.75 inches (1.91 cm).

With reference to FIG. 3B, securement mechanism 140 is shown in an unsecured position, in accordance with various embodiments. A force F2 may be applied to release button 116 and release button 116 may apply a torque T2 to latches 142. When torque T2 is greater than the torque T1 being applied by biasing member 146, release button 116 will travel into housing tray 110 in the direction of arrow 188, and latch 142 will rotate about pivot shaft 144 in a second circumferential direction C2. As latch 142 rotates in second circumferential direction C2, hook end 182 travels in the direction of arrow 188, and spring end 181 travels towards surface 112 of housing tray 110. Spring end 181 traveling towards surface 112 may compress biasing member 146. Torque T2 may cause hook end 182 to travel outside the opening 180 in striker 122. Hook end 182 being located outside of opening 180 may unsecure striker 122 and may allow striker 122 to move in the direction of arrow 187. Hook end 182 being located outside of opening 180 may allow striker 122 to move out of opening 124.

With reference to FIGS. 2B, 2C, and 3B, torque T2 may cause hook end 182 of latch 142 and release button 116 to travel in the direction of arrow 188, until horizontal protrusions 166 of release button 116 contact pivot shaft retainers 148. In other words, hook end 182 of latch 142 and release button 116 may travel in the direction of arrow 188 until horizontal protrusions 166 cause release button 116 to contact pivot shaft retainers 148 (i.e., to "bottom out"). In various embodiments, a thickness (i.e., a dimension measured along the y-axis) of pivot shaft retainers 148 and/or a thickness of horizontal protrusions 166 may be selected to ensure that, when release button 116 contacts pivot shaft retainers 148, hook end 182 of latch 142 is outside the opening 180 in striker 122.

The downward movement of release button 116 may expose a sidewall surface 196 of housing tray 110. In various embodiments, sidewall surface 196 may include a colored sticker or may be painted a different color from surface 112 to provide a visual indication that securement mechanism 140 is in an unsecured position.

When force F2 is removed from surface 158 of release button 116, and/or when torque T2 becomes less than the torque T1 being exerted by compressed biasing member 146 on spring end 181 of latch 142, latch 142 will rotate about pivot shaft 144 in first circumferential direction C1, causing hook end 182 and release button 116 to travel upwards, until release button 116 contacts surfaces 174 of housing tray 110.

With reference to FIG. 1B and FIG. 3A, hook end 182 of latches 142 may include a slanted surface 198. Slanted surface 198 may be oriented between 15° and 75° from vertical (i.e., at an angle of between 15° and 75° relative to a plane perpendicular to surface 112). Slanted surface 198 may allow striker 122 to slide more easily over slanted surface 198 and force latches 142 downward when closing door 102. When securing door 102, a force F3 may be applied against cushion 106 to push door 102 towards housing 108. Force F3 may cause striker 122 to pass through opening 124 in housing tray 110. As striker 122 moves through opening 124, a lead portion 200 of striker 122 may contact and may slide across slanted surface 198 of latches 142. Lead portion 200 sliding across slanted surface 198 may force latches 142 to rotate in second circumferential direction C2 (FIG. 3B), and may momentarily move hook end 182 downward. Once lead portion 200 of striker 122 has cleared hook end 182, in other words, once opening 180 is vertically aligned with hook end 182, the torque exerted by biasing member 146 on spring end 181 may cause latch 142 to rotate in first circumferential direction C1 and move hook end 182 upward and into opening 180. In various embodiments, latches 142, collapsible bulb seals 126, lead portion 200 of striker 122, and/or opening 180 of striker 122 may be configured such that lead portion 200 will not clear hook end 182, until collapsible bulb seals 126 are sufficiently compressed to prevent door 102 from rattling.

With reference to FIGS. 1A, 2A, and 2B, disposing two latches 142 in housing tray 110, with each latch 142 configured to contact an independent biasing member 146, may allow latches 142 to operate independently of one another. Allowing latches 142 to operate independently of one another can create redundancy in the securement of door 102. For example, should one of the latches 142 or one of the biasing member 146 fail, the other latch 142 and/or other biasing member 146 may still be operable and may be employed to secure door 102 to housing tray 110.

Figure 4A:
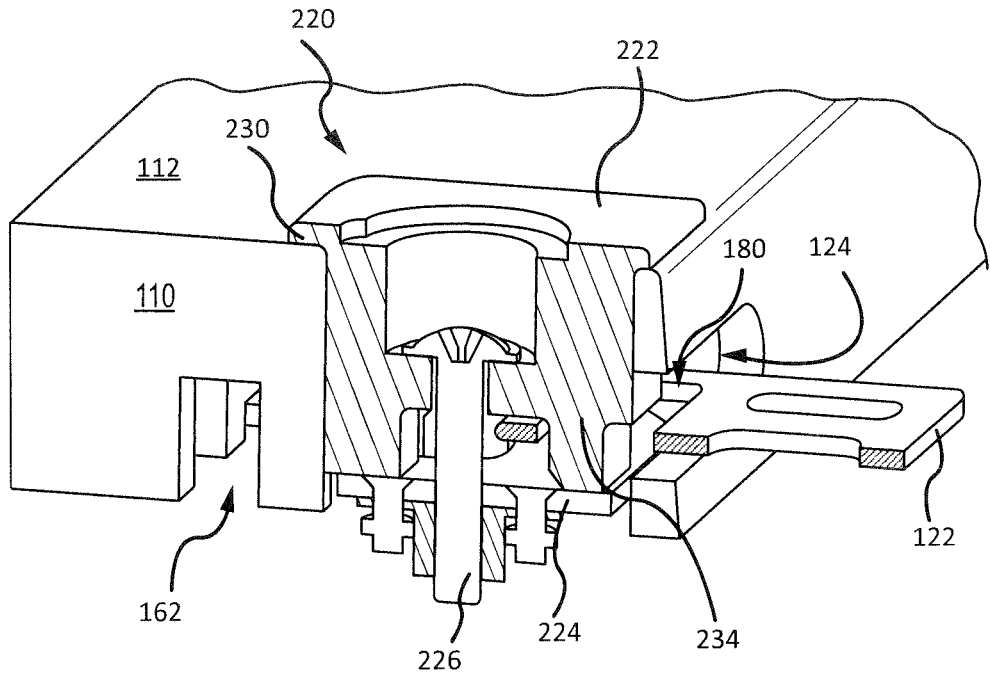
FIGS. 4A and 4B illustrate a securement mechanism for a storage compartment in a seat headrest, in accordance with various embodiments.
Figure 4B:
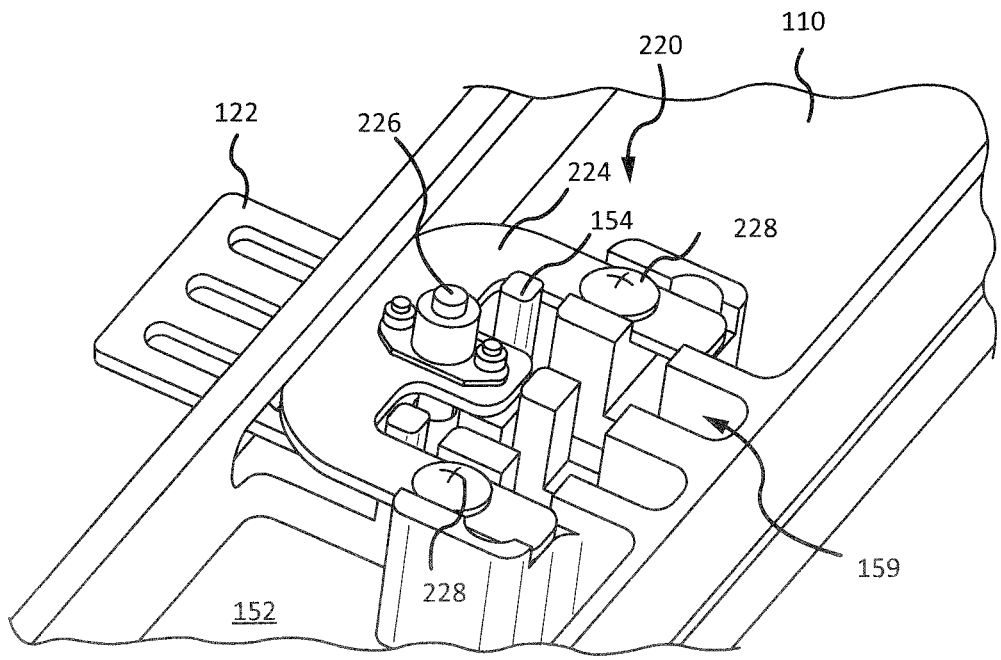

With reference to FIG. 4A and FIG. 4B, a securement mechanism 220 is illustrated, in accordance with various embodiments. Securement mechanism 220 may be disposed within housing tray 110. Securement mechanism 220 may be interchangeable with securement mechanism 140 (FIG. 2A). In other words, the components of housing tray 110 (e.g., guideposts 154, pivot shaft channel 162, latch channels 159, etc.) may be compatible with both securement mechanism 220 and securement mechanism 140. Securement mechanism 220 may permanently secure striker 122 within opening 124 of housing tray 110. In other words, when securement mechanism 220 is disposed within housing tray 110, striker 122 may not be able to exit housing tray 110.

In various embodiments, securement mechanism 220 may include a button replacement component 222, a securing plate 224, a top side screw 226, and two bottom side screws 228. Button replacement component 222 of securement mechanism 220 may be disposed within housing tray 110 in place of release button 116. Button replacement component 222 may include an opening for receiving top side screw 226. The upper portion of button replacement component 222 may have a larger footprint than release button 116. A lip 230 of button replacement component 222 may extend over surface 112 of housing tray 110. A latching portion 234 of button replacement component 222 may extend into opening 180 of striker 122. Top side screw 226 may be threaded through and secured by securing plate 224. Bottom side screws 228 may extend through securing plate 224 and into openings 164 (FIG. 2C) in housing tray 110. Button replacement component 222, securing plate 224, top side screw 226, and bottom side screws 228 of securement mechanism 220 may be configured to keep latching portion 234 of button replacement component 222 within opening 180. Button replacement component 222, securing plate 224, top side screw 226, and bottom side screws 228 of securement mechanism 220 may be configured to prevent striker 122 from exiting opening 124.

Figure 5:
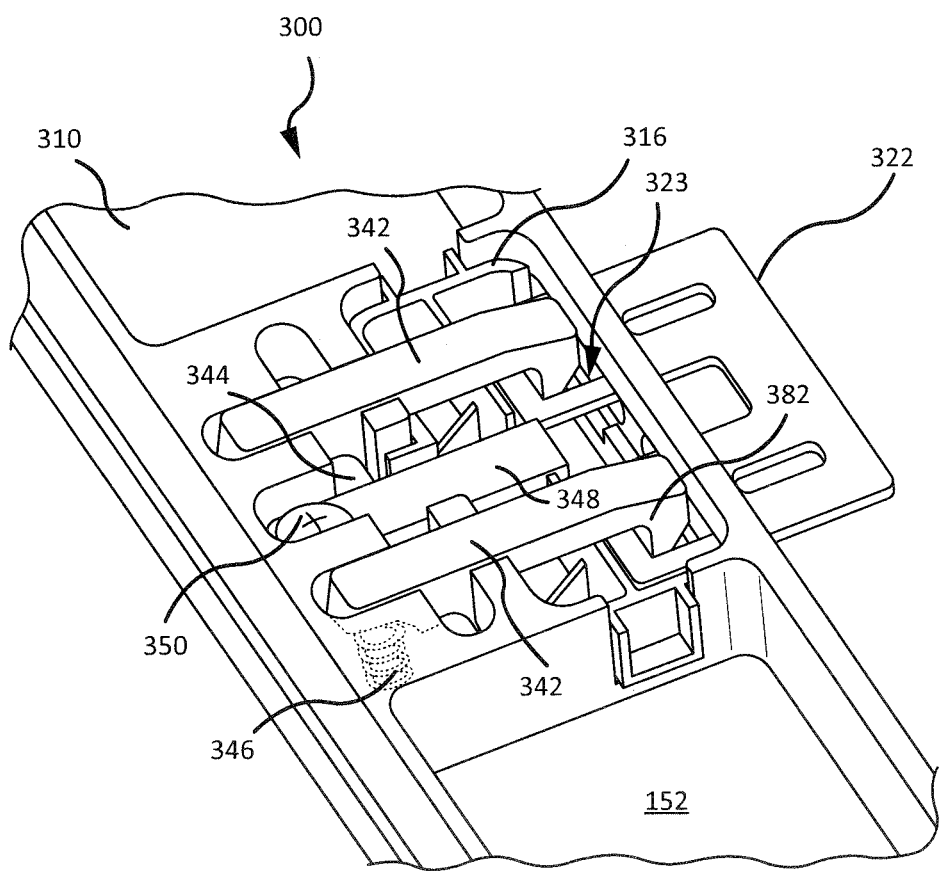
FIG. 5 illustrates a securement mechanism for a storage compartment in a seat headrest, in accordance with various embodiments.

FIG. 5 illustrates a securement mechanism 300, in accordance with various embodiments. In various embodiments, securement mechanism 300 may be housed within a housing tray 310. Housing tray 310 may be coupled to a housing, similar to housing 108 in FIG. 1B. Securement mechanism 300 may include two latches 342, similar to latches 142 in FIG. 2A. Latches 342 may each include a hook end 382, which extends into openings 323 in a striker 322. Striker 322 may be coupled to a door, similar to headrest door 102 in FIG. 1B. In various embodiments, striker 322 may comprise two openings 323 with each opening 232 correlating to a latch 342.

Latches 342 may be mounted to a pivot shaft 344, similar to pivot shaft 144 in FIG. 2A. A pivot shaft retainer 348, similar to pivot shaft retainers 148 in FIG. 2A, may be disposed over pivot shaft 344. Pivot shaft retainer 348 may be secured to housing tray 310 by a screw 350. A pair of biasing members 346, similar to biasing members 146 in FIG. 2B, may be disposed in housing tray 310 and in contact with an end of latches 342 that is opposite a striker 322. A release button 316 may be disposed in housing tray 310. Release button 316 may be configured to contact latches 342. Release button 316 may be configured to be substantially coplanar with the housing tray 310, when securement mechanism 300 is in a secured position. Pressing release button 316 may cause release button 316 to move downward into housing tray 310. Pressing release button 316 may cause latches 342 to rotate about pivot shaft 344. As latches 342 rotate about pivot shaft 344, hook end 382 of latches 342 may be displaced from the openings in striker 322. Once latches 342 are located outside openings 323 in striker 322, striker 322 may be free to exit housing tray 310, and the seat back coupled to striker 322 may release from housing tray 310.

Figure 6:
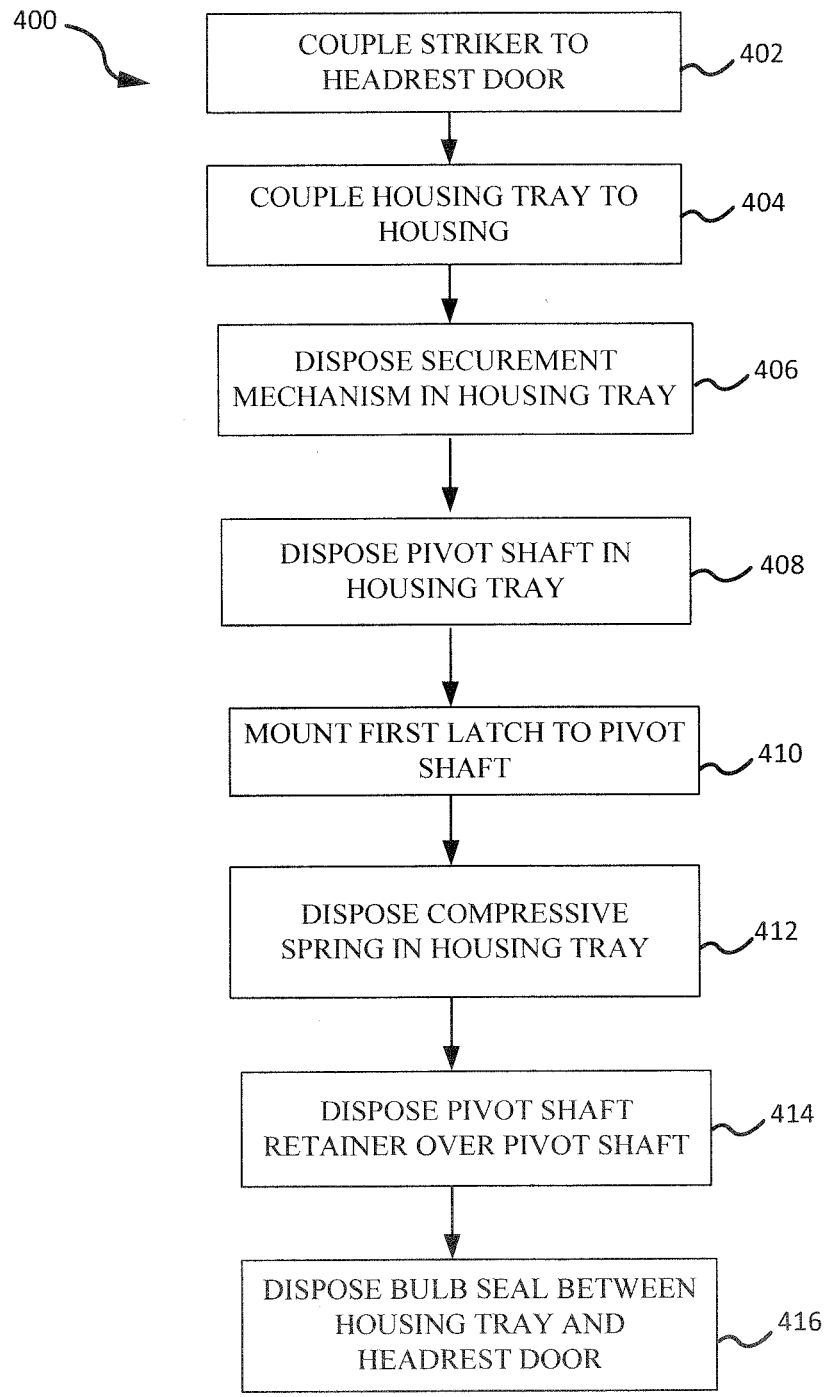
FIG. 6 illustrates a method of securing a storage compartment in a seat headrest, in accordance with various embodiments.

With reference to FIG. 6, a method 400 of securing a seat compartment is illustrated, in accordance with various embodiments. Method 400 may comprise coupling a striker to a headrest door (step 402), coupling a housing tray to a housing (step 404), and disposing a securement mechanism in the housing tray (step 406). The securement mechanism may comprise a first latch configured to extend into an opening in the striker, and a release button contacting the first latch. The release button may be configured to be substantially coplanar with the housing tray when the securement mechanism is in a secured position.

In various embodiments, method 400 may further comprise disposing a pivot shaft in the housing tray (step 408), mounting the first latch to the pivot shaft (step 410), disposing a biasing member in the housing tray (step 412), and disposing a pivot shaft retainer over the pivot shaft (step 414). In various embodiments, the biasing member may contact the first latch. In various embodiments, the securement mechanism may comprise a second latch configured to operate independently of the first latch. In various embodiments, method 400 may further comprise disposing a collapsible bulb seal between the housing tray and the headrest door (step 416).

In various embodiments, with combined reference to FIG. 1B, FIG. 2A, FIG. 2B, and FIG. 3A, step 402 may comprise coupling striker 122 to headrest door 102. Step 404 may comprise coupling housing tray 110 to housing 108. Step 406 may comprise disposing securement mechanism 140 in the housing tray 110. Securement mechanism 140 may comprise first latch 142 configured to extend into opening 180 in striker 122, and release button 116 contacting first latch 142. Release button 116 may be configured to be substantially coplanar with housing tray 110 when securement mechanism 140 is in a secured position.

In various embodiments, with combined reference to FIG. 1B, FIG. 2B, and FIG. 3A, step 408 may comprise disposing pivot shaft 144 in housing tray 110. Step 410 may comprise mounting first latch 142 to pivot shaft 144. Step 412 may comprise disposing biasing member 146 in housing tray 110. Step 414 may comprise disposing pivot shaft retainer 148 over pivot shaft 144. Step 416 may comprise disposing collapsible bulb seal 126 between housing tray 110 and headrest door 102. In various embodiments, biasing member 146 may contact first latch 142. In various embodiments, securement mechanism 140 may comprise a second latch 142 configured to operated independently of the first latch 142.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A securement mechanism for a storage compartment in a seat headrest, comprising:
  a housing tray;
  a pivot shaft disposed in a pivot shaft channel defined by the housing tray;

a first pivot shaft retainer located over the pivot shaft and secured to the housing tray, wherein the first pivot shaft retainer is configured to secure the pivot shaft within the pivot shaft channel;

a first latch disposed in the housing tray and mounted to the pivot shaft; and a release button disposed in the housing tray and contacting the first latch, wherein a hook end of the first latch extends towards the release button, and wherein the release button is configured to be substantially coplanar with the housing tray when the securement mechanism is in a secured position.

2. The securement mechanism of claim 1, further comprising a second latch disposed in the housing tray.

3. The securement mechanism of claim 2, further comprising:

a first biasing member in operable communication with the first latch and biasing the first latch toward a first latch position that secures the securement mechanism; and a second biasing member in operable communication with the second latch and biasing the second latch toward a second latch position that secures the securement mechanism.

4. The securement mechanism of claim 3, wherein the first biasing member is configured to apply a first torque to the first latch and cause the first latch to rotate about the pivot shaft in a first circumferential direction, and wherein the second biasing member is configured to apply a second torque to the second latch and cause the second latch to rotate about the pivot shaft in the first circumferential direction.

5. The securement mechanism of claim 2, further comprising:

a second pivot shaft retainer configured to retain the pivot shaft relative to the housing tray, wherein at least one of the first pivot shaft retainer and the second pivot shaft retainer is configured to provide a contact surface for the release button.

6. The securement mechanism of claim 5, wherein the first latch and the second latch are disposed between the first pivot shaft retainer and the second pivot shaft retainer.

7. The securement mechanism of claim 2, wherein the first pivot shaft retainer is disposed between the first latch and the second latch.

8. The securement mechanism of claim 1, wherein the housing tray comprises a guidepost.

9. The securement mechanism of claim 8, wherein the guidepost of the housing tray is disposed through an opening in the release button.

10. A seat, comprising:
a housing;
a headrest door rotationally coupled to the housing;
a striker coupled to the headrest door;
a housing tray coupled to the housing, wherein the housing tray defines a first opening configured to receive the striker; and
a securement mechanism disposed in the housing tray, the securement mechanism comprising:
a pivot shaft disposed in a pivot shaft channel defined by the housing tray;
a pivot shaft retainer located over the pivot shaft and configured to secure the pivot shaft within the pivot shaft channel;
a first latch comprising a hook end located within the housing tray and configured to extend into a second opening defined by the striker; and
a release button contacting the first latch, wherein the release button is configured to be substantially coplanar with the housing tray when the securement mechanism is in a secured position.

11. The seat of claim 10, wherein the securement mechanism further comprises a second latch configured to extend into the opening in the striker.

12. The seat of claim 10, wherein the securement mechanism further comprises:
a biasing member in operable communication with the first latch.

13. The seat of claim 12, wherein the biasing member is configured to apply a first torque to the first latch and cause the first latch to rotate about the pivot shaft in a first circumferential direction.

14. The seat of claim 13, wherein the release button is configured to apply a second torque to the first latch and cause the first latch to rotate about the pivot shaft in a second circumferential direction opposite the first circumferential direction when the second torque is greater than the first torque.

15. The seat of claim 10, wherein the pivot shaft retainer is configured to provide a contact surface for the release button.

16. The seat of claim 10, further comprising a collapsible bulb seal disposed between the headrest door and the housing tray.

17. A method of securing a storage compartment in a seat, comprising:
coupling a striker to a headrest door;
coupling a housing tray to a housing of the seat, wherein the headrest door is rotationally coupled to the housing; and
disposing a securement mechanism in the housing tray, the securement mechanism comprising:
a pivot shaft disposed in a pivot shaft channel defined by the housing tray;
a first pivot shaft retainer located over the pivot shaft and configured to secure the pivot shaft within the pivot shaft channel;
a first latch located within the housing tray and configured to extend into an opening defined by the striker; and
a release button contacting the first latch, wherein the release button is configured to be substantially coplanar with the housing tray when the securement mechanism is in a secured position.

18. The method of claim 17, further comprising disposing a collapsible bulb seal between the housing tray and the headrest door.

19. The method of claim 17, wherein the securement mechanism further comprises:
a biasing member contacting the first latch.

20. The method of claim 19, wherein the securement mechanism further comprises a second latch configured to operate independently of the first latch.

* * * * *